March 10, 1942. B. DICK 2,276,028
SWITCH
Filed Oct. 11, 1939
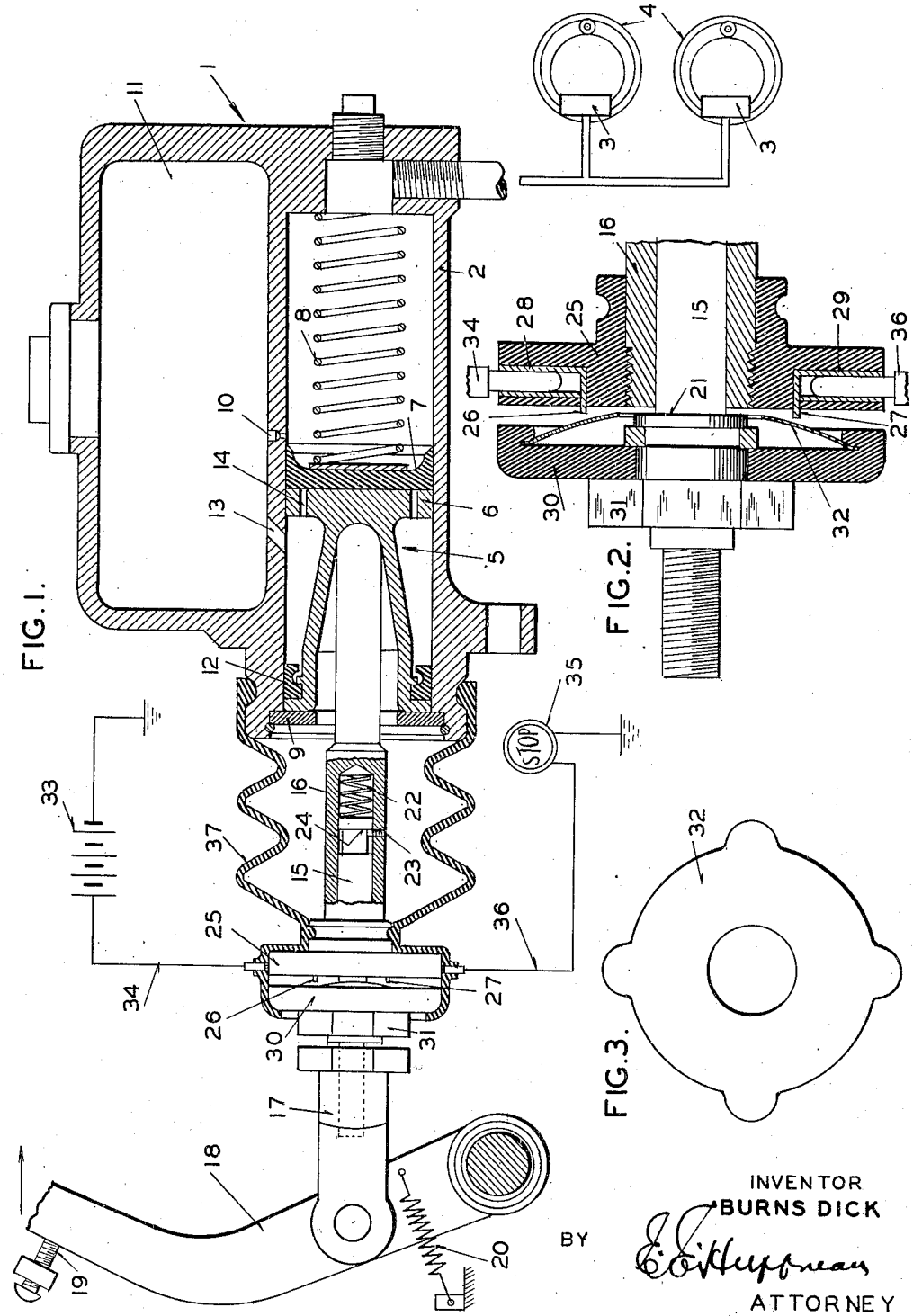
INVENTOR
BURNS DICK
BY
E.E.Huffman
ATTORNEY Patented Mar. 10, 1942

2,276,028

UNITED STATES PATENT OFFICE 2,276,028

SWITCH

Burns Dick, Ferguson, Mo., assignor to Wagner Electric Corporation, St. Louis, Mo., a corporation of Delaware Application October 11, 1939, Serial No. 298,899

4 Claims. (Cl. 200—59)

My invention relates to electrical switches and more particularly to a switch for operating a signal such as the stop light on a motor vehicle.

One of the objects of my invention is to provide an improved electrical switch construction which can be associated with a push-rod employed in applying a force to a displaceable member.

Another and more specific object of my invention is to so construct a switch and associate it with a piston rod of a master cylinder device for fluid-actuated brakes that the switch will be normally open when the brakes are inoperative and closed when the brake pedal is initially operated and prior to applying pressure to the brakes, said switch also being so associated with the rod that it will not act as a force transmitting means when the piston is displaced.

Another object of my invention is to so embody a signal control switch in the piston rod of a master cylinder device that it will become closed to operate the signal when the master cylinder is inoperative and the parts thereof are not correctly adjusted, thus indicating to the operator that certain adjustments are necessary.

Other objects of my invention will become apparent from the following description taken in connection with the accompanying drawing in which Figure 1 is a view of a master cylinder device showing my improved signal control switch embodied in the push-rod; Figure 2 is an enlarged sectional view of the switch; and Figure 3 is a face view of the spring plate contacting element of the switch.

Referring to the drawing in detail, I indicates a well-known type of master cylinder having a cylinder 2 connected to the fluid motors 3 of brakes 4 and a piston 5 for applying pressure to the fluid. The head 6 of the piston has associated therewith a packing cup 7 and the piston is normally biased to its inoperative position by a spring 8 interposed between the cup and the end of the cylinder. The retracted or inoperative position of the piston is determined by the stop 9 and when the piston is in this position, the cup uncovers the porthole 10 and places the cylinder ahead of the piston in communication with the reservoir 11 to allow for expansion and contraction of the fluid in the system, and also to supply any lost fluid or to permit excess fluid to return to the reservoir. The rear of the piston is provided with a packing cup 12 to form a sealed chamber around the piston, which chamber is connected to the reservoir by a passage 13. The head of the cup is provided with passages 14 permitting fluid to flow past the cup during its retractile stroke and thus prevent sub-atmospheric pressure from existing in the system in the event the piston is retracted faster than the fluid is returned from the fluid motors 3.

The push-rod for the piston comprises two rods 15 and 16, the former telescoping in the latter which cooperates with a socket in the piston. The outer end of rod 15 of the push-rod carries an adjustable clevis 17 and is pivotally connected to a brake pedal 18 biased to an inoperative position against a stop 19 by a spring 20. The rod 15 has a shoulder 21 for abutment against the end of rod 16 whereby force can be transmitted from the pedal to the piston. A spring 22, weaker than spring 8, is interposed between the telescoping ends of rods 15 and 16 to bias the shoulder 21 away from the end of rod 16. A screw stop 23 cooperating with a shoulder 24 carried by the inner end of rod 15 determines the extent of lost motion between the rods.

A member 25 of insulating material is threaded on the end of rod 16 and carried by this member are two electrical contacts 26 and 27 extending from connecting sockets 28 and 29, respectively. A second member 30 of insulating material is clamped on rod 15 by a nut 31 and carried by the peripheral portion of this member is a dished metal spring plate 32 for cooperating with the contacts 26 and 27 to electrically connect them together under certain conditions. The contact 26 is connected to a grounded battery 33 by a conductor 34 and the contact 27 is connected to a grounded stop light or other signal device 35 by a conductor 36, thus completing the electrical circuit. In order that the switch structure may be protected from dust and dirt, the outer end of the dust excluding boot 37 of the master cylinder is extended to enclose both members 25 and 30.

When the master cylinder device is inoperative and the brakes released, the parts are in the positions shown in Figure 1. The clevis 17 is so adjusted that with the pedal against the stop 19 and the piston in retracted position against stop 9, the shoulder 21 will be held away from the end of rod 16 by the light spring 22. The rod 16 will be in engagement with the piston. Under these conditions, the spring plate will be out of engagement with the contacts 26 and 27 and the switch will be open.

When the pedal is initially moved in the direction indicated by the arrow to apply the brakes, the rod 15 will first be moved relatively to rod 16 and the piston will not be moved against spring 8 since this spring is stronger than spring 22. The spring contacting plate 32 will thus be caused to engage the contacts 26 and 27, thereby closing the circuit and lighting the stop light. As the switch is closed, shoulder 21 will also be brought into engagement with the end of rod 16 and as the pedal continues to be moved, force will be transmitted to the piston and cause it to apply pressure to the fluid and actuate the brakes. The switch will remain closed until the brakes are released and the parts return to their respective positions shown in Figure 1.

The switch construction and the manner in which it is associated with the master cylinder and the push-rod also permits the signal system to act as a warning in the event certain adjustments are not correct. The pedal stop 19 is generally carried on the body of the vehicle and may even be the floorboard whereas the master cylinder and pedal are mounted on the chassis. It is thus possible that the stop 19 may assume such a position that the pedal cannot return to its proper "off" position and permit the piston to assume its normal inoperative position a few thousandths of an inch back of the porthole 10. If the porthole is not uncovered, the brakes may not be fully released or if released, they may be caused to be re-applied sufficiently to drag in the event of an increase in temperature causing expansion of the fluid. If this occurs, the switch will be held closed and the operator will know that if the stop light remains lighted after the pedal is released, then the braking system needs attention and adjustment.

It is to be noted that the switch and push-rod construction may be made economically and readily substituted for existing push-rods. Also, there is no danger of the switch affecting the fluid braking system as would be the case where the switch is closely associated with the fluid system and operated by fluid pressure therein. In the latter type of switch, a short circuit may cause sufficient heat to "gas" the fluid and cause loss of brakes or even such damage that some of the fluid will escape.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking apparatus, a master cylinder for producing fluid pressure, a member for operating said device, a push-rod between the member and master cylinder and comprising two parts capable of relative movement prior to operating the master cylinder, a normally open electrical switch so mounted and associated with the parts as to be caused to assume closed position by the relative movement of the parts toward each other, and a dust excluding boot surrounding the push-rod and enclosing the switch.

2. In a fluid pressure braking system, a master cylinder device having a movable piston, a retractile stop for the piston, an actuating member, a connection between the member and piston, a retractile stop for the actuating member, and switch means so associated with the connection that said switch means will be in closed position if the stop for the actuating member is so positioned with respect to the piston stop that the piston cannot return to a position engaging its retractile stop.

3. In a fluid pressure braking system, a master cylinder device comprising a cylinder, a piston, a reservoir, a porthole between the reservoir and cylinder and a stop for the piston which is to be so positioned as to permit the porthole to be uncovered by the piston when the piston engages the stop, an actuating member, a stop determining the retracted position of the member, a connection between the actuating member and piston comprising two elements which have limited relative movement when the piston is against its stop and the stop for the actuating member is properly positioned relative to the piston stop, and a switch so associated with said connecting elements that it will be open when the actuating member is retracted and the stops are properly positioned, the switch if open under said conditions and fluid pressure is present in the master cylinder device then said open switch will be an indication that said fluid pressure is caused by the improper position of the piston stop preventing the piston from uncovering the porthole and not the improper relative position of the stops.

4. In braking apparatus, a force transmitting connection between an actuated element and an actuating element and comprising two rods provided with abutments whereby when they are engaged force can be transmitted by the rods, means biasing the two rods to normally inoperative positions permitting relative movement prior to engagement of the abutments, a member of insulating material secured to each rod, said members being axially spaced apart, two diametrically positioned electrical contacts carried by one member and projecting toward the other member, a disk-like element of conducting material carried by the other member and axially spaced from the contacts when the rods are in their normally inoperative positions but capable of engaging the contacts when the rods are moved relatively and prior to engagement of the abutments, said disk-like member being so constructed and mounted as to be axially yieldable to permit engagement of the abutments after it engages the contacts.

BURNS DICK.